(12) United States Patent
Sezener et al.

(10) Patent No.: US 12,585,912 B2
(45) Date of Patent: Mar. 24, 2026

(54) GATED LINEAR CONTEXTUAL BANDITS

(71) Applicant: DeepMind Technologies Limited, London (GB)

(72) Inventors: Eren Sezener, London (GB); Joel William Veness, London (GB); Marcus Hutter, London (GB); Jianan Wang, Kai Tak (HK); David Budden, London (GB)

(73) Assignee: GDM Holding LLC, Mountain View, CA (US)

( * ) Notice: Subject to any disclaimer, the term of this patent is extended or adjusted under 35 U.S.C. 154(b) by 893 days.

(21) Appl. No.: 17/766,854

(22) PCT Filed: Oct. 8, 2020

(86) PCT No.: PCT/EP2020/078259
§ 371 (c)(1),
(2) Date: Apr. 6, 2022

(87) PCT Pub. No.: WO2021/069574
PCT Pub. Date: Apr. 15, 2021

(65) Prior Publication Data
US 2023/0079338 A1 Mar. 16, 2023

Related U.S. Application Data

(60) Provisional application No. 62/912,599, filed on Oct. 8, 2019.

(51) Int. Cl.
*G06N 3/006* (2023.01)
*G06N 3/063* (2023.01)

(52) U.S. Cl.
CPC ............. *G06N 3/006* (2013.01); *G06N 3/063* (2013.01)

(58) Field of Classification Search
CPC ........ G06N 3/006; G06N 3/063; G06N 3/045; G06N 3/048; G06N 7/01; G06N 3/088
See application file for complete search history.

(56) References Cited

FOREIGN PATENT DOCUMENTS

| | | |
|---|---|---|
| CN | 102571570 A | 7/2012 |
| CN | 108351982 A | 7/2018 |
| CN | 109155005 A | 1/2019 |
| WO | WO 2019/106132 | 6/2019 |
| WO | WO 2020/152300 A1 | 7/2020 |

OTHER PUBLICATIONS

Xu et al., "Application of Binary Neural Networks for Classification", Nov. 2003, Proceedings of the Second International Conference on Machine Learning and Cybernetics (Year: 2003).*

Bubeck et al., "Lipschitz Bandits without the Lipschitz Constant", Jul. 2011, arXiv:1105.5041 (Year: 2011).*
Vaswani et al., "New Insights into Bootstrapping for Bandits", May 2018, arXiv:1805.09793 (Year: 2018).*
Kumar et al., "Hierarchical Multi-Armed Bandits for Discovering Hidden Populations", Aug. 2019, 2019 IEEE/ACM International Conference on Advances in Social Networks Analysis and Mining, https://ieeexplore.ieee.org/document/9073137 (Year: 2019).*
Minitab, "Introduction to Data Binning", https://www.minitab.com/en-us/products/spm/user-guides/, archived May 22, 2019 at the Wayback Machine (Year: 2019).*
Allesiardo et al., "A Neural Networks Committee for the Contextual Bandit Problem," Lecture Notes in Computer Science, Jan. 2014, 8834:374-381.
Auer et al., "Finite-time analysis of the multiarmed bandit problem," Mach. Learn., May 2002, 47(2-3):235-256.
Bellemare et al., "Unifying count-based exploration and intrinsic motivation," Advances in Neural Information Processing Systems 29, 2016, pp. 1471-1479.
Blundell et al., "Weight uncertainty in neural network," Proceedings of the 32nd International Conference on Machine Learning, Jul. 2015, 37:1613-1622.
Charikar et al., "Finding frequent items in data streams," Proceedings of the 29th International Colloquium on Automata, Languages and Programming, Jan. 1, 2002, pp. 693-703.
Charikar, "Similarity estimation techniques from rounding algorithms," STOC '02: Proceedings of the thiry-fourth annual ACM symposium on Theory of computing, May 2002, pp. 380-388.
Chen et al., "Halfspace mass: a maximally robust and efficient data depth method," Machine Learning, Aug. 5, 2015, 100(2):677-699.
Cormode et al., "An improved data stream summary: The count-min sketch and its applications," J. Algorithms, Apr. 2005, 55(1):58-75.
Elmachtoub et al., "A Practical Method for Solving Contextual Bandit Problems Using Decision Trees," CoRR, Jun. 14, 2017, arxiv.org/abs/1706.04687, 19 pages.
Hernandez-Lobato et al., "Black-box alpha divergence minimization," Proceedings of The 33rd International Conference on Machine Learning, Jun. 2016, 48:1511-1520.

(Continued)

*Primary Examiner* — Jennifer N Welch
*Assistant Examiner* — Vijay M Balakrishnan
(74) *Attorney, Agent, or Firm* — Fish & Richardson P.C.

(57) ABSTRACT

Methods, systems, and apparatus, including computer programs encoded on computer-readable storage media, for training a neural network to control a real-world agent interacting with a real-world environment to cause the real-world agent to perform a particular task. One of the methods includes training the neural network to determine first values of the parameters by optimizing a first task-specific objective that measures a performance of the policy neural network in controlling a simulated version of the real-world agent; obtaining real-world data generated from interactions of the real-world agent with the real-world environment; and training the neural network to determine trained values of the parameters from the first values of the parameters by jointly optimizing (i) a self-supervised objective that measures at least a performance of internal representations generated by the neural network on a self-supervised task performed on the real-world data and (ii) a second task-specific objective.

20 Claims, No Drawings

(56) References Cited

OTHER PUBLICATIONS

International Preliminary Report on Patentability in International Appln. No. PCT/EP2020/078259, dated Apr. 12, 2022, 13 pages.

International Search Report and Written Opinion in International Appln. No. PCT/EP2020/078259, dated Feb. 16, 2021, 16 pages.

Kocsis et al., "Bandit based monte-carlo planning," Proceedings of the 17th European Conference on Machine Learning, ECML'06, 2006, pp. 282-293.

Lattimore et al., "Nearoptimal PAC bounds for discounted MDPs,", Theoretical Computer Science, Nov. 13, 2014, 558:125-143.

Li et al., "A contextual-bandit approach to personalized news article recommendation," CoRR, Feb. 28, 2010, arxiv.org/abs/1003.0146, 10 pages.

Mandt et al., "A variational analysis of stochastic gradient algorithms," Proceedings of The 33rd International Conference on Machine Learning, Jun. 22, 2016, 48:354-363.

Osband et al., "Deep exploration via bootstrapped DQN," Advances in Neural Information Processing Systems 29, 2016, pp. 4026-4034.

Osband et al., "Randomized prior functions for deep reinforcement learning," Proceedings of the 32nd International Conference on Neural Information Processing Systems, 2018, pp. 8626-8638.

Plappert et al., "Parameter space noise for exploration," CoRR, Jun. 6, 2017, arxiv.org/abs/1706.01905, 18 pages.

Riquelme et al., "Deep bayesian bandits showdown: An empirical comparison of bayesian deep networks for thompson sampling." CoRR, Feb. 26, 2018, arxiv.org/abs/1802.09127, 27 pages.

Russo et al., "Learning to Optimize via Posterior Sampling," Mathematics of Operations Research, Apr. 23, 2014, 39(4)1221-1243.

Snoek et al., "Scalable bayesian optimization using deep neural networks," Proceedings of the 32nd International Conference on International Conference on Machine Learning, 2015, 37:2171-2180.

Srivastava et al., "Dropout: A simple way to prevent neural networks from overfitting," J. Mach. Learn. Res., Jan. 2014, 15(1):1929-1958.

Strehl et al., "An analysis of model-based interval estimation for markov decision processes," Journal of Computer and System Sciences, Dec. 2008, 74(8):1309-1331.

Tang et al., "#Exploration: A study of count-based exploration for deep reinforcement learning," Proceedings of the 31st International Conference on Neural Information Processing Systems, Dec. 2017, pp. 2750-2759.

Veness et al., "Online learning with gated linear networks," CoRR, Dec. 5, 2017, arxiv.org/abs/1712.01897, 40 pages.

Zhao et al., "Evolutionary design of neural network tree—integration of decision tree, neural network and GA," Proceedings of the 2001 Congress on Evolutionary Computation (IEEE Cat. No.01TH8546), May 27-30, 2001, 1:240-244.

Zinkevich, "Online convex programming and generalized infinitesimal gradient ascent," Proceedings of the Twentieth International Conference (ICML 2003), Aug. 21-24, 2003, pp. 928-936.

Office Action in European Appln. No. 20789076.5, mailed on Feb. 14, 2025, 12 pages.

Sezener et al., "Online Learning in Contextual Bandits using Gated Linear Networks," CoRR, Feb. 21, 2020, arXiv:2002.11611v1, 14 pages.

Office Action in Chinese Appln. No. 202080070862.5, mailed on May 9, 2025, 46 pages (with English translation).

Office Action in Chinese Appln. No. 202080070862.5, mailed on Aug. 27, 2025, 21 pages (with English translation).

Veness et al., "Gated Linear Networks," CoRR, submitted on Sep. 30, 2019, arXiv:1910.01526v1, 12 pages.

* cited by examiner

GATED LINEAR CONTEXTUAL BANDITS

CROSS-REFERENCE TO RELATED APPLICATIONS

This application is a National Stage Application under 35 U.S.C. § 371 and claims the benefit of International Application No. PCT/EP2020/078259, filed Oct. 8, 2020, which claims priority to U.S. Provisional Application No. 62/912, 599, filed Oct. 8, 2019. The disclosures of the foregoing applications are incorporated herein by reference in their entirety.

BACKGROUND

This specification relates to selecting actions in response to context inputs.

In a contextual bandits scenario, an agent iteratively selects actions to be performed from a set of possible actions. At each iteration, the agent receives a context input that is associated with the iteration and then selects the action for the iteration based on the context input.

SUMMARY

This specification generally describes a system that repeatedly selects actions to be performed in response to received context inputs.

Each action is selected from a predetermined set of actions and the system selects actions in an attempt to maximize the rewards received in response to the selected actions. Generally, the rewards are numeric values that measure the quality of the selected actions. In some implementations, the reward for each action is either zero or one, while in other implementations the reward is a value drawn from a continuous range between a lower bound reward value and an upper bound reward value.

In some cases, the actions are recommendations of content items, e.g., videos, advertisements, images, search results, or other pieces of content, and the context input represents a feature vector characterizing the current recommendation setting, i.e., data describing the circumstanced in which the content item is going to be recommended, e.g., any of the current time, attributes of the user device of the user to whom the recommendation will be displayed, attributes of previous content items that been recommended to the user and user responses to those previous content items, and attributes of the setting in which the content item is going to be placed. In these cases, the reward values measure the quality of the recommendation. For example, the value might be one if the user interacted with the recommendation and zero if the user did not. As another example, the reward value may be a value that measures the degree of future user engagement with content items recommended to the user after the current recommendation is made.

In some other cases, the actions are user interface elements that may be presented to a user in a user interface, i.e., in a given presentation setting, and the context input represents a feature vector characterizing the given presentation setting, the user, or both.

To select the action, the system maintains data specifying one or more gated linear networks corresponding to each of the plurality of actions. When the rewards are either zero or one, a single gated linear network corresponds to each of the plurality of actions and is configured to predict a probability that a reward will be received, i.e., a probability that the reward will be one instead of zero, if the corresponding action is performed in response to an input context.

When the rewards are continuous values drawn from a range, a tree of gated linear networks corresponds to each of the plurality of actions and the range is divided into bins. The tree of gated linear networks corresponding to a given action are collectively configured to predict a respective probability for each of the bins that represents the likelihood that the received reward will fall in the corresponding bin if the corresponding action is performed in response to an input context.

To select an action for a given context input, for each action the system processes the context input using the one or more gated linear networks corresponding to the action to generate either (i) a predicted probability that a reward of one will be received or (ii) a respective probability for each bin.

The system then selects the action to be performed using the outputs of the gated linear networks by generating an action score for the action from the outputs of the gated linear network(s) for the action and, in some cases, a pseudo-count. The pseudo-count is also generally determined from the one or more gated linear networks corresponding to the action as described below.

The system then selects the action to be performed in response to the context based on the action scores, e.g., by selecting the action with the highest action score.

Certain novel aspects of the subject matter of this specification are set forth in the claims below, accompanied by further description in Appendix A.

The subject matter described in this specification can be implemented in particular embodiments so as to realize one or more of the following advantages.

The described systems select actions in a contextual bandits setting, i.e., in response to context inputs, using gated linear networks. Such an action selection scheme will be referred to as a gated linear contextual bandit. Using gated linear networks to select actions results in more accurate action selections, i.e., in terms of received rewards, while reducing the amount of computational resources required to generate an action selection. This can be attributed to several features of the described scheme. As one example, the described scheme allows the system to estimate prediction uncertainty with effectively zero algorithmic overhead by leveraging the data-dependent gating properties of the GLN, allowing for more accurate pseudo-counts to be computed without adding computational overhead and resulting in more effective exploration of the space of possible actions. As another example, the system can compute an action score for an action and an update to the weights of a gated linear network for the action in one single forward pass through the gated linear network, eliminating the computationally intensive backward pass that is required to update model weights for conventional systems that use conventional deep neural networks to generate action scores.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of selecting an action from a set of actions to be performed in response to each context in a sequence of contexts, the method comprising:

maintaining data specifying a respective gated linear network corresponding to each action of the set of actions, wherein each gated linear network is configured to predict a probability that a reward will be received if the corresponding action is performed in response to an input context, and wherein each gated linear network comprises a plurality of layers, each layer comprising one or more neurons, wherein each neuron in each layer after the first layer is configured to receive (i) the input context and (ii) predictions from neurons in a previous layer and to (iii) apply a gating function to the input context to select a weight vector and (iv) generate as output a geometric mixture of the predictions from the neurons in the previous layer based on the selected weight vector;

for each context in the sequence of contexts:

for each action, processing the context using the gated linear network corresponding to the action to generate a predicted probability;

for each action, generating an action score for the action from at least the predicted probability, comprising:

computing a pseudo-count for the action, wherein computing the pseudo-count comprises determining an overlap between (i) a signature of the context across the gating functions of the neurons in the gated linear network for the action and (ii) signatures of any earlier contexts in the sequence for which the action was selected as the action to be performed in response to the earlier context, wherein the signature of the context characterizes outputs of the gating functions of the neurons in the gated linear network corresponding to the action generated by processing the context; and generating the action score from the predicted probability for the action and the pseudo-count for the action; and selecting the action to be performed in response to the context based on the action scores.

2. The method of claim 1, wherein selecting the action to be performed in response to the context based on the action scores comprises selecting the action with a highest action score.

3. The method of claim 1, further comprising:

for each context in the sequence of contexts:

receiving a reward; and updating the gated linear network for the selected action based on the reward.

4. The method of claim 3, wherein updating the gated linear network for the selected action comprises:

updating each neuron in the gated linear network locally based on a neuron-specific loss.

5. The method of claim 1, wherein a last layer of the plurality of layers includes only a single neuron, and wherein the predicted probability of the gated linear network is the output of the single neuron.

6. The method of claim 1, wherein the neurons in the first layer of the plurality of layers receive the input context and a set of base predictions.

7. The method of claim 1, wherein determining the overlap comprises:

determining a count of how many earlier contexts satisfy both (1) the action was selected in response to the earlier context and (2) for each neuron in the gated linear network for the action, the output of the gating function for the neuron for the earlier context is the same as the output of the gating function for the neuron for a current context.

8. The method of claim 1, wherein the set of actions are recommendations of content items.

9. A method of selecting an action from a set of actions to be performed in response to each context in a sequence of contexts, the method comprising:

maintaining data specifying a respective tree of gated linear networks corresponding to each action of the set of actions, wherein each tree of gated linear networks is collectively configured to predict a respective probability for each of a plurality of bins of a range of reward values, wherein the respective probability for each bin represents a likelihood that a reward that falls in the bin will be received if the corresponding action is performed in response to an input context, and wherein each gated linear network comprises a plurality of layers, each layer comprising one or more neurons, wherein each neuron in each layer after the first layer is configured to receive (i) the input context and (ii) predictions from neurons in a previous layer and to (iii) apply a gating function to the input context to select a weight vector and (iv) generate as output a geometric mixture of the predictions from the neurons in the previous layer based on the selected weight vector;

for each context in the sequence of contexts:

for each action, processing the context using the tree of gated linear networks corresponding to the action to generate a respective probability for each of the plurality of bins of the range of reward values;

for each action, generating an action score for the action from at least the respective probabilities, comprising:

computing a pseudo-count for the action, the computing the pseudo-count comprises determining an overlap between (i) a signature of the context across the gating functions of the neurons in the gated linear networks in the tree of gated linear networks for the action and (ii) signatures of the context across the gating functions of the neurons in the gated linear networks in the tree of gated linear networks for any earlier contexts in the sequence for which the action was selected as the action to be performed in response to the earlier context, wherein the signature of a context refers to the outputs of the gating functions of the neurons in the gated linear networks in the tree of gated linear networks for the action generated by processing the context; and selecting the action to be performed in response to the context based on the action scores.

10. The method of claim 9, wherein selecting the action to be performed in response to the context based on the action scores comprises selecting the action with a highest action score.

11. The method of claim 9, further comprising: for each context in the sequence of contexts:

receiving a reward; and updating the tree of gated linear networks for the selected action based on the reward.

12. The method of claim 11, wherein updating the tree of gated linear networks for the selected action comprises:

for each neuron on a path to an identified bin through the tree of gated linear networks for the selected action, updating the neuron locally based on a neuron-specific loss.

13. The method of claim 9, wherein a last layer of the plurality of layers includes only a single neuron, and wherein the predicted probability of the gated linear network is the output of the single neuron.

14. The method of claim 9, wherein the neurons in the first layer of the plurality of layers receive the input context and a set of base predictions.

15. A system comprising one or more computers and one or more storage devices storing instructions that when executed by one or more computers cause the one or more computers to perform operations for selecting an action from a set of actions to be performed in response to each context in a sequence of contexts, the operations comprising:

maintaining data specifying a respective gated linear network corresponding to each action of the set of actions, wherein each gated linear network is configured to predict a probability that a reward will be received if the corresponding action is performed in response to an input context, and wherein each gated linear network comprises a plurality of layers, each layer comprising one or more neurons, wherein each neuron in each layer after the first layer is configured to receive (i) the input context and (ii) predictions from neurons in a previous layer and to (iii) apply a gating function to the input context to select a weight vector and (iv) generate as output a geometric mixture of the predictions from the neurons in the previous layer based on the selected weight vector;

for each context in the sequence of contexts:

for each action, processing the context using the gated linear network corresponding to the action to generate a predicted probability;

for each action, generating an action score for the action from at least the predicted probability, comprising:

computing a pseudo-count for the action, wherein computing the pseudo-count comprises determining an overlap between (i) a signature of the context across the gating functions of the neurons in the gated linear network for the action and (ii) signatures of any earlier contexts in the sequence for which the action was selected as the action to be performed in response to the earlier context, wherein the signature of the context characterizes outputs of the gating functions of the neurons in the gated linear network corresponding to the action generated by processing the context; and generating the action score from the predicted probability for the action and the pseudo-count for the action; and selecting the action to be performed in response to the context based on the action scores.

16. The system of claim 15, wherein selecting the action to be performed in response to the context based on the action scores comprises selecting the action with a highest action score.

17. The system of claim 15, the operations further comprising:

for each context in the sequence of contexts:

receiving a reward; and updating the gated linear network for the selected action based on the reward.

18. The system of claim 17, wherein updating the gated linear network for the selected action comprises:

updating each neuron in the gated linear network locally based on a neuron-specific loss.

19. The system of claim 15, wherein a last layer of the plurality of layers includes only a single neuron, and wherein the predicted probability of the gated linear network is the output of the single neuron.

20. The system of claim 15, wherein the neurons in the first layer of the plurality of layers receive the input context and a set of base predictions.

\* \* \* \* \*